(12) United States Patent
Hora

(10) Patent No.: US 7,134,961 B2
(45) Date of Patent: Nov. 14, 2006

(54) MANAGEMENT OF PLAYER INFORMATION IN A MULTIPLAYER NETWORK GAME ENVIRONMENT

(75) Inventor: Masahiro Hora, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 650 days.

(21) Appl. No.: 10/228,037

(22) Filed: Aug. 27, 2002

(65) Prior Publication Data

US 2003/0045360 A1    Mar. 6, 2003

(30) Foreign Application Priority Data

Aug. 28, 2001 (JP) .......................... P2001-257223
Sep. 14, 2001 (JP) .......................... P2001-279325

(51) Int. Cl.
*A63F 9/24* (2006.01)
(52) U.S. Cl. ...................................................... 463/42
(58) Field of Classification Search .................. 463/42
See application file for complete search history.

(56) References Cited

U.S. PATENT DOCUMENTS

| 5,823,879 A | * | 10/1998 | Goldberg et al. ............. 463/42 |
| 6,001,016 A | * | 12/1999 | Walker et al. ................ 463/42 |
| 6,152,824 A |   | 11/2000 | Rothschild et al. |
| 6,487,583 B1 | * | 11/2002 | Harvey et al. .............. 709/204 |
| 6,524,189 B1 | * | 2/2003 | Rautila .......................... 463/40 |

FOREIGN PATENT DOCUMENTS

| EP | 1078667 | 2/2001 |
| JP | 816440 | 1/1996 |
| JP | 200010868 | 1/2000 |
| JP | 2001014282 | 1/2001 |
| JP | 2001076179 | 3/2001 |
| JP | 2001142801 | 5/2001 |
| WO | 9704391 | 2/1997 |
| WO | 00/10099 | 2/2000 |

OTHER PUBLICATIONS

Japanese Notice of Reasons for refusal mailed on Aug. 26, 2003 for Japanese Application No. 2001-279325 w/English translation.*
English Language Translation for JP Appln. No. 8-16440.
English Language Translation for JP Appln. No. 2000-10868.
English Language Abstract of JP Appln. No. 2001-014282.
English Language Abstract of JP Appln. No. 2001-0 76179.
English Language Abstract of JP Appln. No. 2001-142801.

* cited by examiner

Primary Examiner—Mark Sager
Assistant Examiner—Robert Mosser
(74) Attorney, Agent, or Firm—Greenblum & Bernstein, P.L.C.

(57) ABSTRACT

A player can easily select a desired game, and the information about players can be appropriately managed and provided. A user terminal transmits self-introduction information to a room master. The room master adds the self-introduction information from the user terminal to the player table list. Additionally, the self-introduction information is added to update history data, and a count value of the update history counter is incremented. The user terminal adds the current count value of the update history counter and ask the room master for an update history. Upon receipt of the update history requests from multiple user terminals, the room master transmits data to all user terminal members (addressed to the IRC channel) in the room. The data is transmitted sequentially from the update history data associated with the oldest update counter value in the requests to the update history data associated with the latest history counter value of the room master.

10 Claims, 7 Drawing Sheets

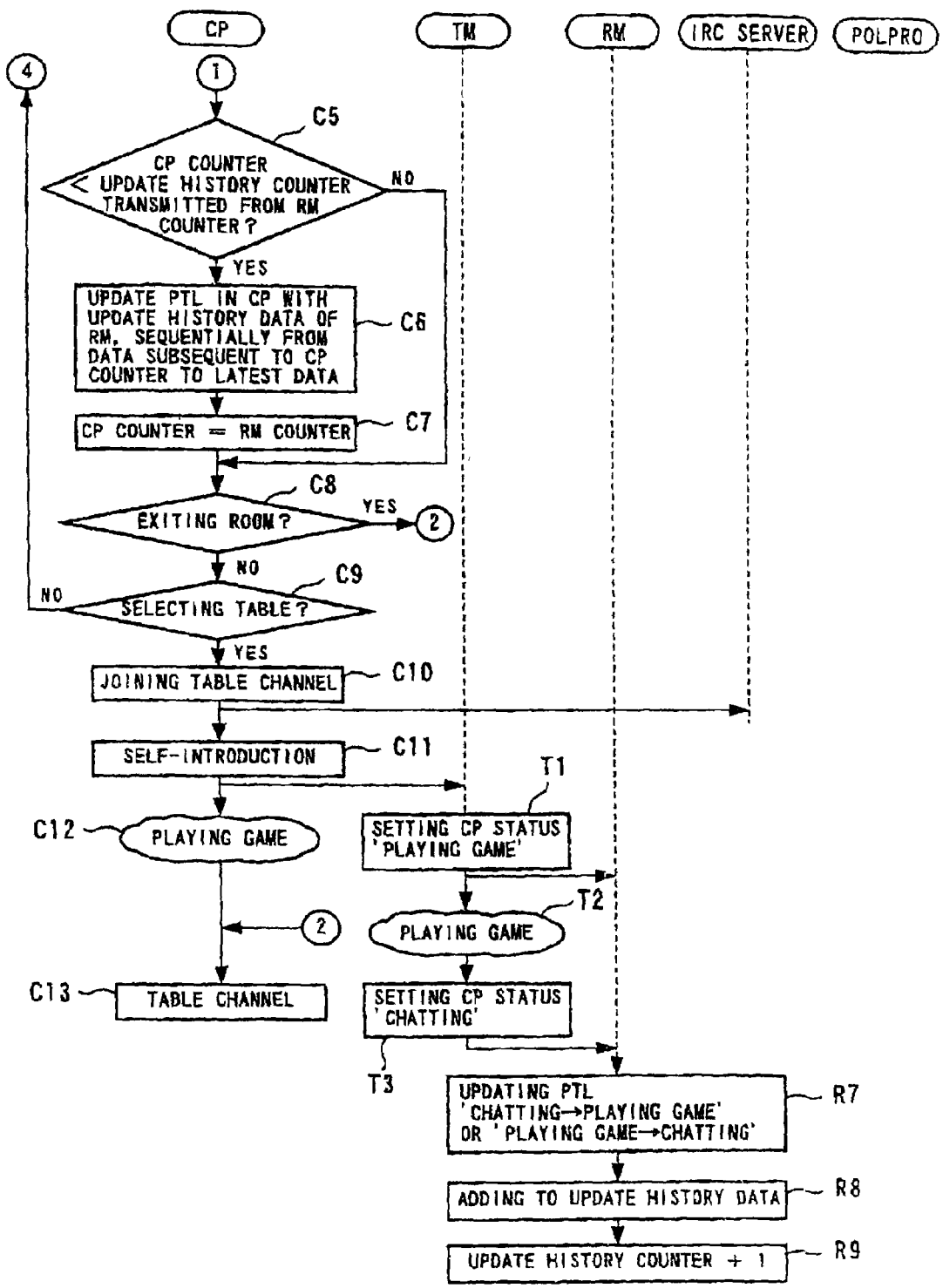

MANAGEMENT OF PLAYER INFORMATION IN A MULTIPLAYER NETWORK GAME ENVIRONMENT

CROSS REFERENCE TO RELATED APPLICATIONS

The present disclosure relates to subject matter contained in Japanese Patent Application No. 2001-257223, filed on Aug. 28, 2001, and Japanese Patent Application No.2001-279325, filed on Sep. 14, 2001, the disclosures of which are expressly incorporated herein by reference in their entireties.

BACKGROUND OF THE INVENTION

1. Field of the Invention

The present invention relates to an online game system. More particularly, the present invention relates to player information management.

2. Description of the Related Art

Recently, there has been an increasing number of video games (online games) operating on a network in which multiple players can simultaneously take part in a game using the network. In an online game, multiple terminals operated by respective players are connected to a game server group through a network, and communications are established between the terminals and the game server group. The game server group includes a server to which multiple video game machines are connected so that players can select other players to play with. The server can be referred to as a lobby server because it provides a virtual lobby for communications among players.

When a video game machine is connected to a lobby server, a screen showing a virtual 'lobby' is displayed on the display device of the video game machine. On the lobby screen, the character of a player and the characters of other players connected to the lobby server are displayed. The player can chat with other players so that they can communicate with one another and look for other players to play with.

When a desired game is selected from the menu displayed on the lobby screen, a video game machine is connected to one of the game servers in the game server group, and the game screen is displayed on the display device of the video game machine, thereby starting the game.

However, when there are an enormous number of selectable games, a player cannot easily select a desired game on the lobby screen. Therefore, the lobby is divided into multiple sections so that the players can easily select desired games. However, when a lobby is divided into a number of sections, the information about players in each section cannot be strategically provided. As a result, the information about the players in each section cannot be appropriately offered. Furthermore, dividing a lobby into a number of sections complicates management of the information about players, thereby assigning a heavy load to the server system and the network.

SUMMARY OF THE INVENTION

The present invention has been made to solve the above mentioned problems, and aims at allowing a player to easily select a desired game. The present invention also aims at appropriately providing the information about players, and further aims at properly managing the information about the players.

To solve the problems, according to a first aspect of the present invention, there is provided an online system having multiple client systems operated by players, and a server system connected to the client system through a network. The server system forms a virtual space through which information about the players is provided for the client systems.

The server system includes a generating system that generates update history information about the players, based on a change in an involvement status of the players in the virtual space. The server system further includes an order information generating system that generates order information indicating a generation order of the update history information. The server system further includes a storage system that stores the update history information together with the order information. The server system further includes a transmitter that transmits, to the client system, the order information subsequent to current order information on a client side, together with the update history information corresponding to the order information.

The client system includes an order information storage system that stores the latest order information on the client side corresponding to the update history information received by the server system. The client system further includes a transmission requesting system that transmits, to the server system, a request for the update history information not yet received by the client system, which request includes the latest order information on the client side. The client system further includes a receiver that receives the update history information transmitted from the server system, together with corresponding order information. The client system further includes an updating system that updates the information about players in accordance with the update history information received by the receiver. The client system further includes an order updating system that causes the order information storage system to store the order information received by the receiver as the latest order information on the client side.

Therefore, only the update history information not obtained by the client system can be appropriately provided. That is, the least possible data about players can be transmitted to the client system. The client system can appropriately manage the latest information about players. The order information is expressed by, for example, a value indicating the order by sequentially increasing the value.

Furthermore, the server system according to a second aspect of the present invention is connected to multiple client systems through a network. The server system forms a virtual space through which information about players is provided for the client systems. The server system includes a generating system that generates update history information about the players, based on a change in an involvement status of the players in the virtual space. The server system further includes an order information generating system that generates order information indicating a generation order of the update history information. The server system further includes a storage system that stores the update history information together with the order information. The server system further includes a transmitter that transmits, to the client system, the order information subsequent to current order information on a client side, together with the update history information corresponding to the order information.

The virtual space includes multiple first spaces, second spaces obtained by dividing each of the first spaces, and third spaces obtained by dividing each of the second spaces. The generating system generates the update history information, based on a change in an involvement status of the players in the third space. By managing the virtual space as described above, the players can easily move around in the virtual space.

The transmitter may transmit to the multiple client systems the order information subsequent to current order information in the order information transmitted by the multiple client systems, together with the update history information corresponding to the order information. Thus, the server system manages the update history information about each of multiple of clients, but there is no need to transmit the information to each client, thereby reducing the processing. Furthermore, the latest player information can be provided for the multiple clients.

The transmitter transmits the update history information in accordance with an order in which the update history information is generated. Thus, the latest player information can be provided by prioritizing the client system which has obtained only older update history information.

According to a third aspect of the present invention, there is provided a client that is operated by a player and connected to a server system which forms a virtual space through which information about players is provided. The client system includes an order information storage system that stores latest order information on a client side corresponding to update history information received by the server system. The client system further includes a transmission requesting system that transmits, to the server system, a request for update history information not yet received by the client system, which request includes the latest order information on the client side. The client system further includes a receiver that receives the update history information transmitted from the server system, together with corresponding order information. The client system further includes an updating system that updates the information about players in accordance with the update history information received by the receiver. The client system further includes an order updating system that causes the order information storage system to store the order information received by the receiver as the latest order information on the client side.

According to a fourth aspect of the present invention, there is provided a player information providing method for use with a server system connected to client systems through a network. The server system forms a virtual space through which information about players is provided for the client systems. The method includes generating update history information about the players, based on a change in an involvement status of the players in the virtual space, and generating order information indicating a generation order of the update history information. The method further includes storing the update history information together with the order information, and transmitting, to the client system, the order information subsequent to current order information on a client side, together with the update history information corresponding to the order information.

According to a fifth aspect of the present invention, there is provided a player information management method for use with a client system operated by a player and connected to a server system. The server system forms a virtual space through which information about players is provided. The method includes storing latest order information on a client side corresponding to update history information received by the server system. The method includes transmitting, to the server system, a request for update history information not yet received by the client system, which request includes the latest order information on the client side. The method further includes receiving the update history information transmitted from the server system, together with corresponding order information. The method further includes updating the information about players in accordance with the received update history information, and storing the received order information as the latest order information on the client side.

According to a sixth aspect of the present invention, there is provided a storage medium on which is recorded a player information providing program for causing a computer to provide information about players by forming a virtual space for a client connected through a network. The program causes the computer to generate update history information about the players based on a change in an involvement status of the players in the virtual space. The program further causes the computer to generate order information indicating a generation order of the update history information, and to store the update history information together with the order information. The program further causes the computer to transmit, to the client system, the order information subsequent to the current information on a client side, together with the update history information corresponding to the order information.

According to a seventh aspect of the present invention, there is provided a storage medium on which is recorded a player information management program for causing a computer to manage player information provided by a server system which forms a virtual space. The program causes the computer to store latest order information on a client side corresponding to the update history information received by the client system. The program further causes the computer to transmit, to the server system, a request for update history information not yet received by the client system, which request includes the latest order information on the client side. The program further causes the computer to receive the update history information transmitted from the server system, together with corresponding order information. The program further causes the computer to update the information about players in accordance with the received update history information, and to store the received order information as the latest order information on the client side.

BRIEF DESCRIPTION OF THE DRAWINGS

FIG. 7 is a flowchart of the operation subsequent to the processing of FIG. 6.

DETAILED DESCRIPTION OF THE PREFERRED EMBODIMENTS

Embodiments of the present invention will be described with reference to the attached drawings The embodiments are realized by applying the present invention to the online game providing system for providing multiple players with a match in a game using a server on a network. First, a configuration of the system is explained with reference to FIGS. 1–5.

(System Configuration)

Figure 1:
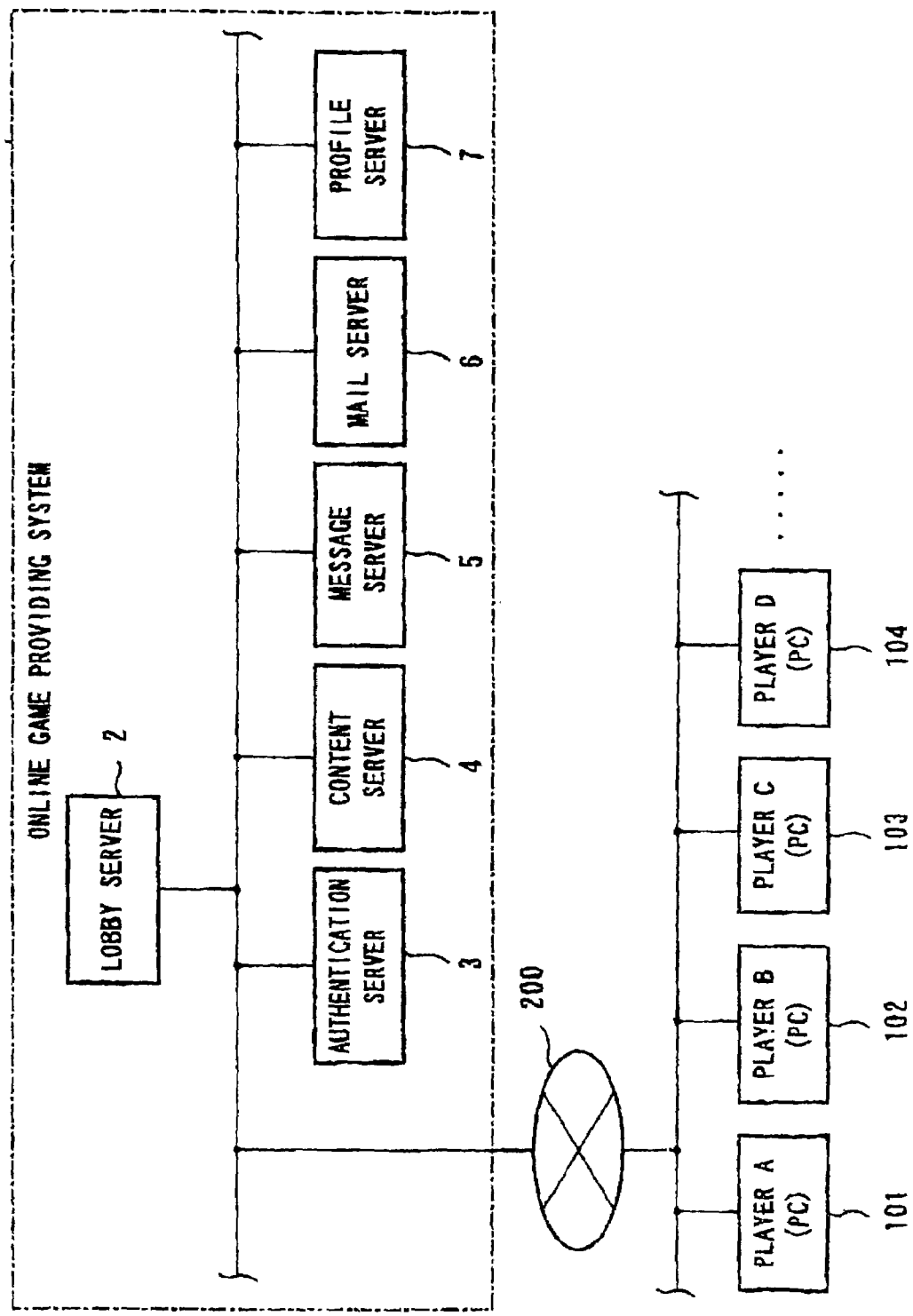
FIG. 1 is a block diagram of an online game system according to an embodiment of the invention.

FIG. 1 is a block diagram of a configuration of the system for providing an online game according to an embodiment of the present invention. On a network 200, a online game providing system 1, which is an example of a server system, and information terminals 101–104 . . . , which are examples of client systems, used by multiple players (players A–D . . . ) on the client side are connected. The information terminals 101–104 can be personal computers (hereinafter referred to as PCs 101–104) connected to the lines on the network. However, the present invention is not limited to this configuration, and a client system including the body of a game machine, a TV receiver, an operation controller, or a wireless mobile terminal can be used. That is, a system including a computer for executing a program can be used.

(Online Game Providing System)

The online game providing system 1 provides multiple players A–D with a place for a match in a predetermined game. In other embodiments, the online game system 1 may support fewer or more players. The online game providing system 1 includes a lobby server 2, an authentication server 3, a content server 4, a message server 5, a mail server 6, and a profile server 7.

The authentication server 3 manages the accounts (user IDs) and passwords of multiple players A–D, and also manages the addresses of PCs 101–104. The content server 4 provides various information about sports, music, movies, local information, broadcast (TV and radio), etc. The message server 5 provides an environment for exchanging messages in real time, and routes (sets a destination and a path) a message for chat, etc. The mail server 6 provides an environment for exchanging electronic mail among the players A–D. The profile server 7 manages the profiles of the players A–D corresponding to their accounts. Each of the players A–D registers his/her own profile in the online game providing system 1 through the PCs 101–104.

(Lobby Server)

Figure 2:
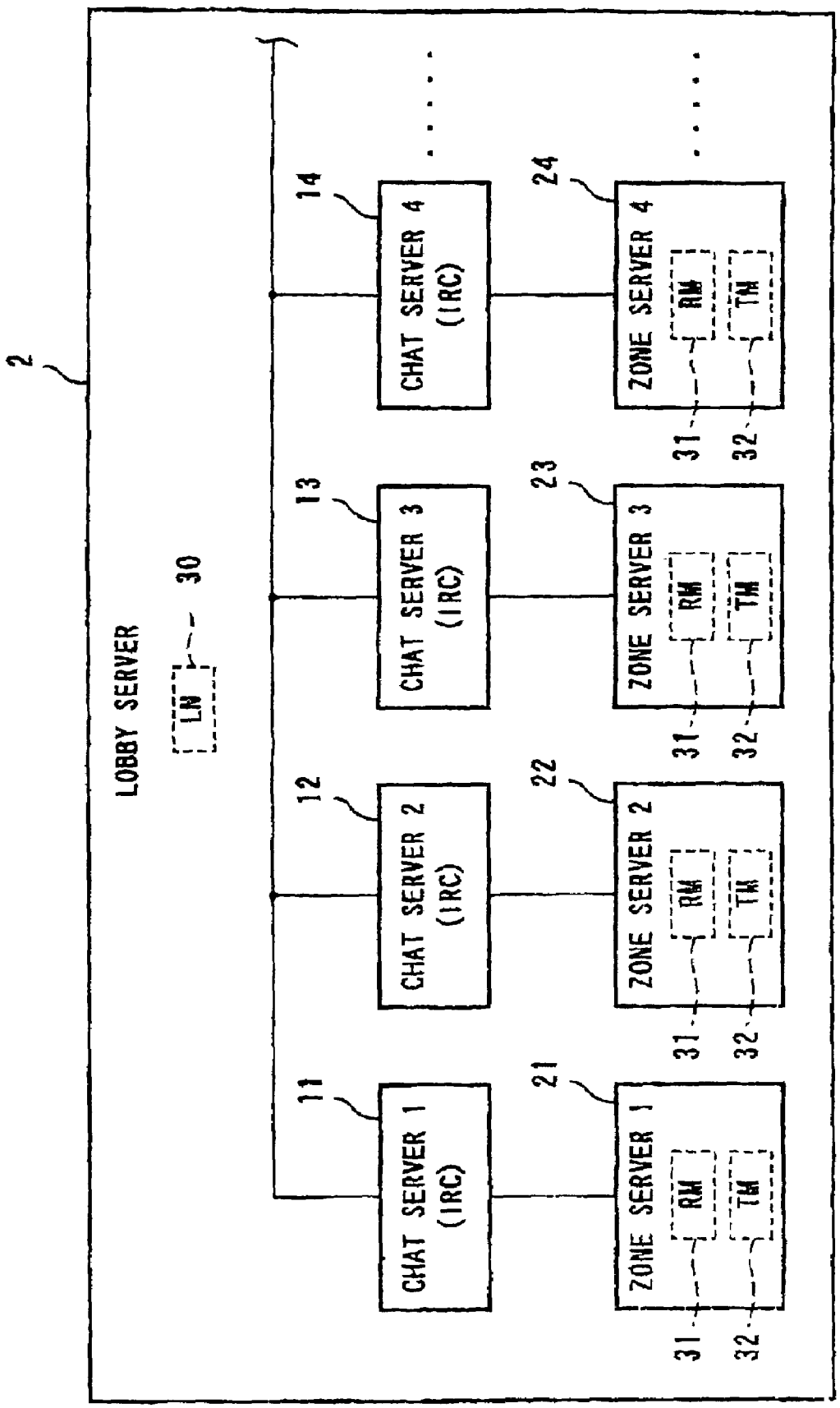
FIG. 2 is a block diagram of a lobby server according to an embodiment of the invention.

FIG. 2 is a block diagram showing details of the lobby server 2. The lobby server 2 includes multiple chat servers (IRCs: Internet Relay Chat) 11–14 and multiple zone servers 21–24. The lobby server 2 has a management master program including a game lobby (LN: lobby navigator) 30. The zone servers 21–24 include a management program including a room master (RM) 31 and a table master (TM) 32. The IRCs 11–14 route messages for transmission and reception among servers.

(Hierarchical Structure)

Figure 3:
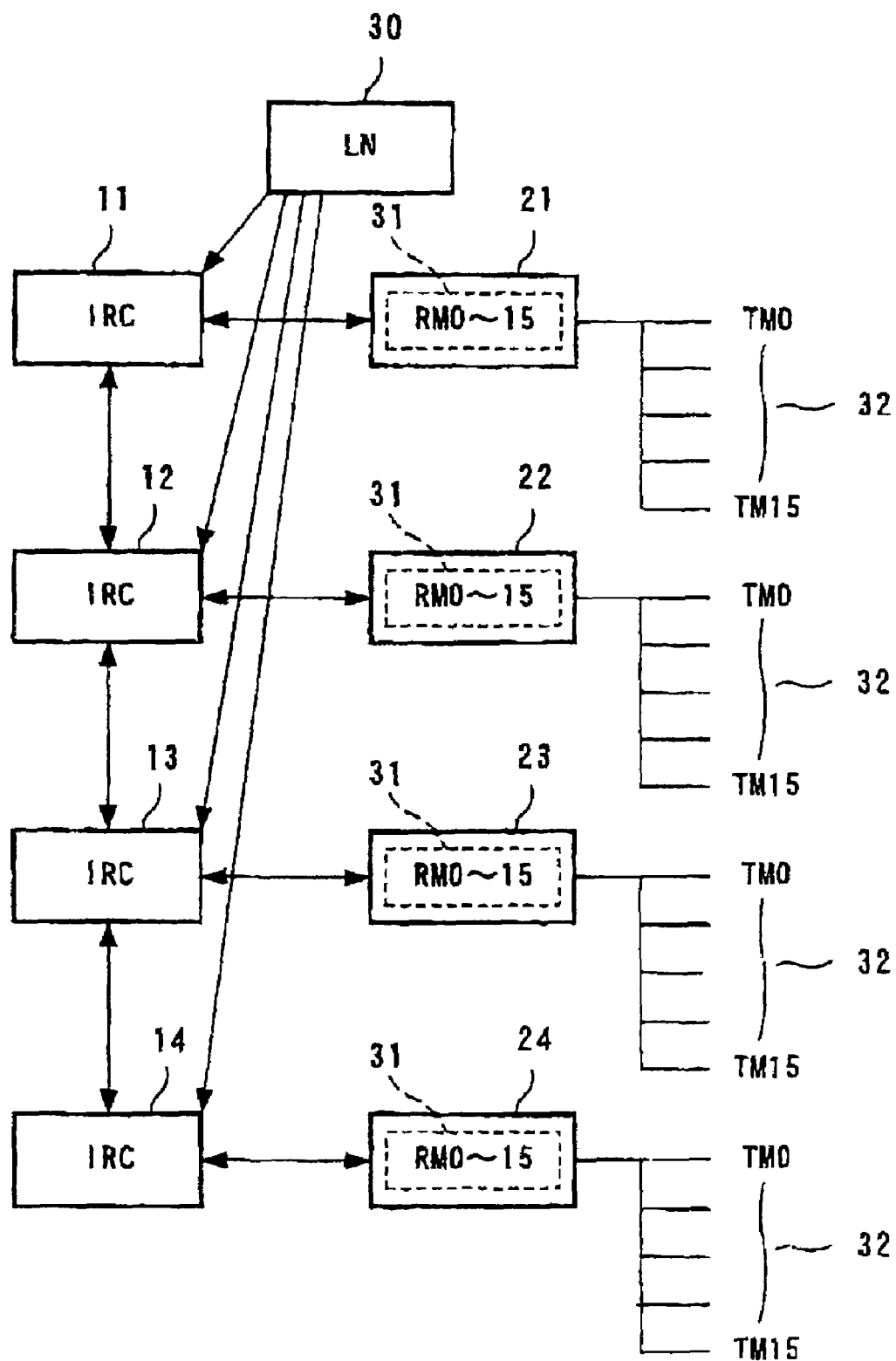
FIG. 3 is a block diagram showing a connection status of each management program according to an embodiment of the invention.
Figure 4:
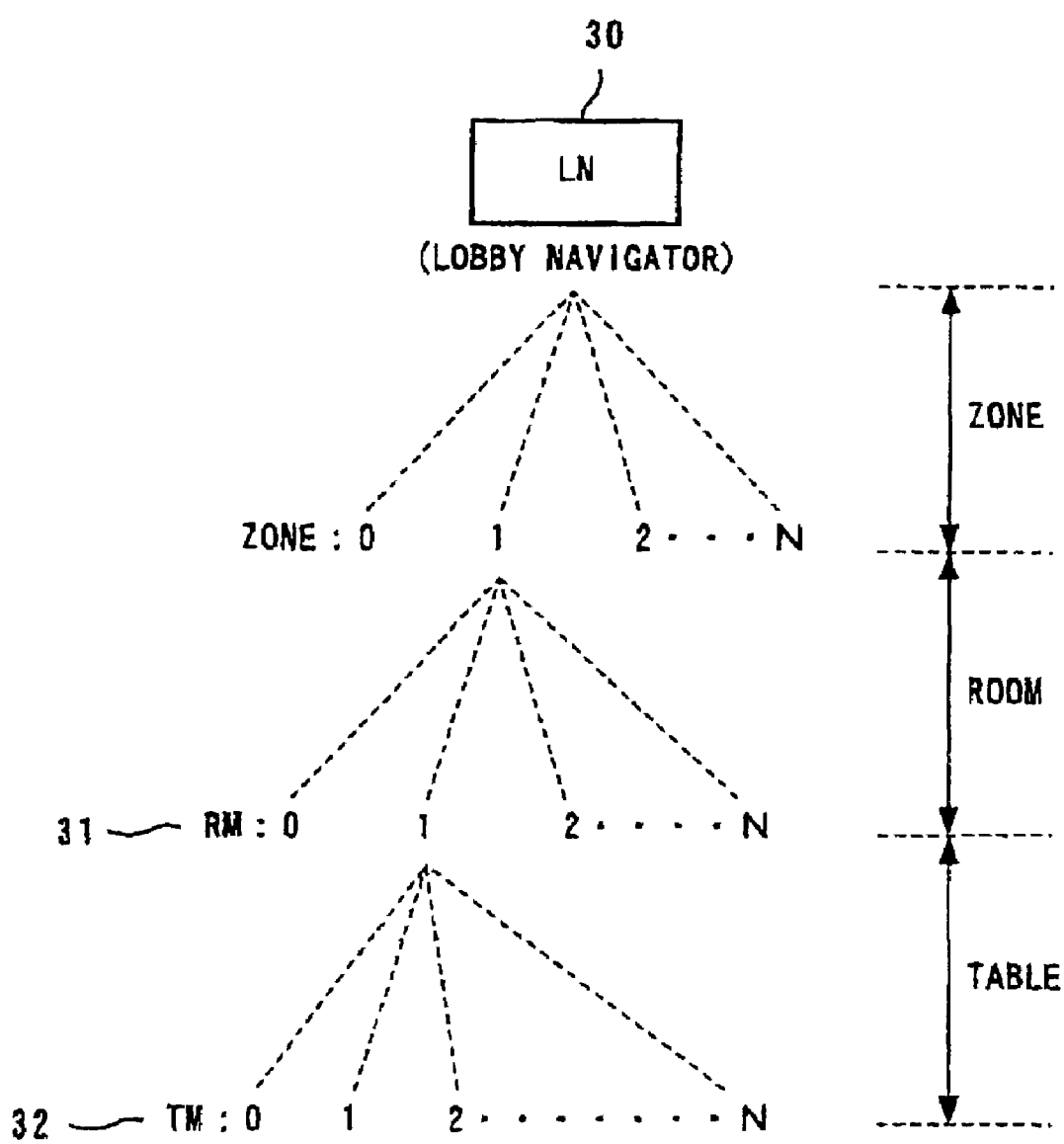
FIG. 4 is a block diagram showing a tree configuration of each type of program according to an embodiment of the invention.

FIGS. 3 and 4 show the hierarchical structure of each management master program (LN 30, RM 31, and TM 32). As shown in FIG. 3, in the lobby server 2, the LN 30 selects a zone server through the IRCs 11–14. In the zone servers 21–24, the RM 31 selects the rooms 0–15, and the TM 32 selects the tables 0–15. As shown in FIG. 4, each management master program is configured as a parent-child-grandchild tree structure. The LN 30 has 0–N zones. The RM 31 is located below the LN 30, and has 0–N rooms. The TM 32 is located below the RM 31, and has 0–N tables.

(Various Functions of Lobby Server)

Figure 5:
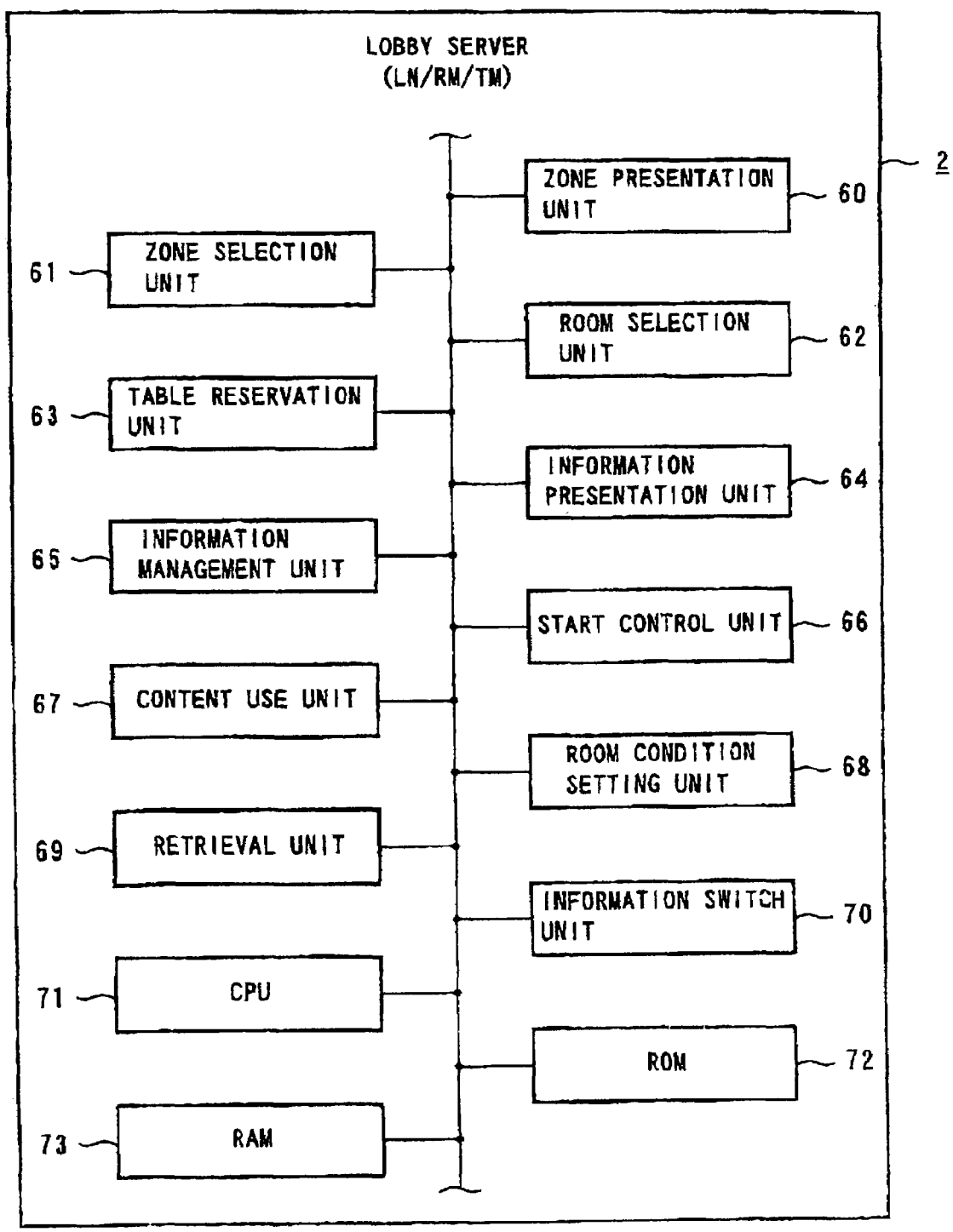
FIG. 5 is a block diagram showing the details of the lobby server according to an embodiment of the invention.

FIG. 5 is a block diagram of various functions provided for the lobby server 2. The lobby server 2 includes a zone presentation unit 60, a zone selection unit 61, a room selection unit 62, a table reservation unit 63, an information presentation unit 64, an information management unit 65, a start control unit 66, a content use unit 67, a room condition setting unit 68, a retrieval unit 69, and an information exchange unit 70. The lobby server 2 is also provided with a CPU 71 for controlling an overall process, ROM 72 storing each type of control program, and RAM 73 for providing an area in which data is temporarily stored and various arithmetic processes are performed.

The zone presentation unit 60 has the function of presenting a lobby, which is divided into multiple play zones based on the matching conditions. The zone selection unit 61 has the function of selecting a play zone (can be referred to simply as a zone) desired by each player. The room selection unit 62 has the function of selecting a play room (room) desired by each player among multiple rooms prepared in the selected play zone. The table reservation unit 63 has the function of reserving a table where each player participates in a game.

The information presentation unit 64 has the function of presenting play information including at least the number of participants, a play rule, and player information for each play room or a play table. The information management unit 65 has the function of setting and changing the content of the presented play information. The start control unit 66 has the function of starting a game when predetermined information in the play information satisfies a play condition. The content use unit 67 has the function of collecting and using content information other than games during the period when the information presentation unit 64 presents the play information. The room condition setting unit 68 has the function of setting a use condition of a play room. The retrieval unit 69 has the function of retrieving other players in each play room. The information exchange unit 70 has the function of exchanging information, including at least a chat, a message, a trade among other players, in each play room.

(Explanation of Operations)

The operations of the embodiments of the present invention with the above mentioned configuration is described below by referring to the flowcharts shown in FIGS. 6 and 7.

Each symbol, etc. shown in the flowcharts and discussed in the associated description has the following definition.

CP: client player user terminal (hereinafter referred to simply as a user terminal): the information terminals 101–104 (PCs 101–104). In an embodiment, each function described later is realized by executing a program stored in a storage medium such as a CD-ROM, etc.

LN: lobby navigator: the above mentioned lobby management program, which exists uniquely in a game, and manages a zone and a room.

RM: room master: the above mentioned room master, which is a room management program managing the player table in the room.

TM: table master: the above mentioned table master, which is a table game management program managing the progress of a game relating to the players at the table.

POLPRO: file access server, which exists in the profile server 7, reserves a user area for each client (including game master (GM) and CP), and manages the file access among the clients.

IRC server: IRC message server: the above mentioned IRCs (Internet relay chat) 11–14 through which a message (MSG) is transmitted/received among clients (including GM and CP). The IRC server manages the client, using a nickname specific to each client. The MSG is transmitted/received among the clients by specifying the nickname of the desired client.

Channel: In the IRC, a client optionally can belong to (join in) a channel. To a client belonging to a channel, a MSG can be simultaneously transmitted by specifying a channel name as a destination. To a player not belonging to a channel (PART), a MSG can only be transmitted with a specified nickname.

Zone: an example of the first space, and a space dividing a virtual space for convenience. In this embodiment, since communications are not established over multiple zones basically, the load on a server can be distributed.

Room: an example of the second space, and a child of a zone. There are multiple rooms in a zone for a rule, a level, a purpose, etc. in a game. In a room, an RM for management of the room and a player in the room belong to the same IRC channel, and the player can receive a message addressed to the channel, and a chat using the IRC system can be realized.

Table: An example of the third space, and a child of a room, that is, a grandchild of a zone. On a table, a player enjoys a game with other players. On the table, a TM managing the table and the player at the table belong to the same IRC channel, and the player can receive an MSG addressed to the channel.

PTL: player table list: room player table listing information. Managed by an RM, and periodically stored in a POLPRO user area of an RM. The list stores a nickname status, which is an example of the information about each player in the room (for example, in the process of a game, in a chat, etc.). The list further stores an IRC channel name status of each table (during the game, in an empty state, in a player recruiting process, etc.), and a update history counter for sharing player table information between the CPs and an RM.

Update history data: Update history information is generated each time a room state changes, that is, when a player enters or exits a room, the status of a player changes, the status of a table changes, etc. The update history data is stored in the memory together with the value of an update history counter.

Update history counter: An example of order information. The count value of the counter is incremented every time the update history data is generated.

Intra-room player table information: current information about the player table reflecting update information, and being shared between the CP and the RM in memory (with time lag). Saved in the POLPRO as a PTL together with the update history counter.

Update history request: The CP transmits its own latest update history counter to the RM, and requests newer update history data.

Update history reply: The RM, upon receiving the update history request from multiple CPs, transmits the update history data to all CPs in the room (addressed to the IRC channel). Specifically, the data is transmitted sequentially, from the update history data with the oldest counter in the update history requests, to the latest update history data in the room master. In this process, the CP ignores update history data older than its own update history counter.

Figure 6:
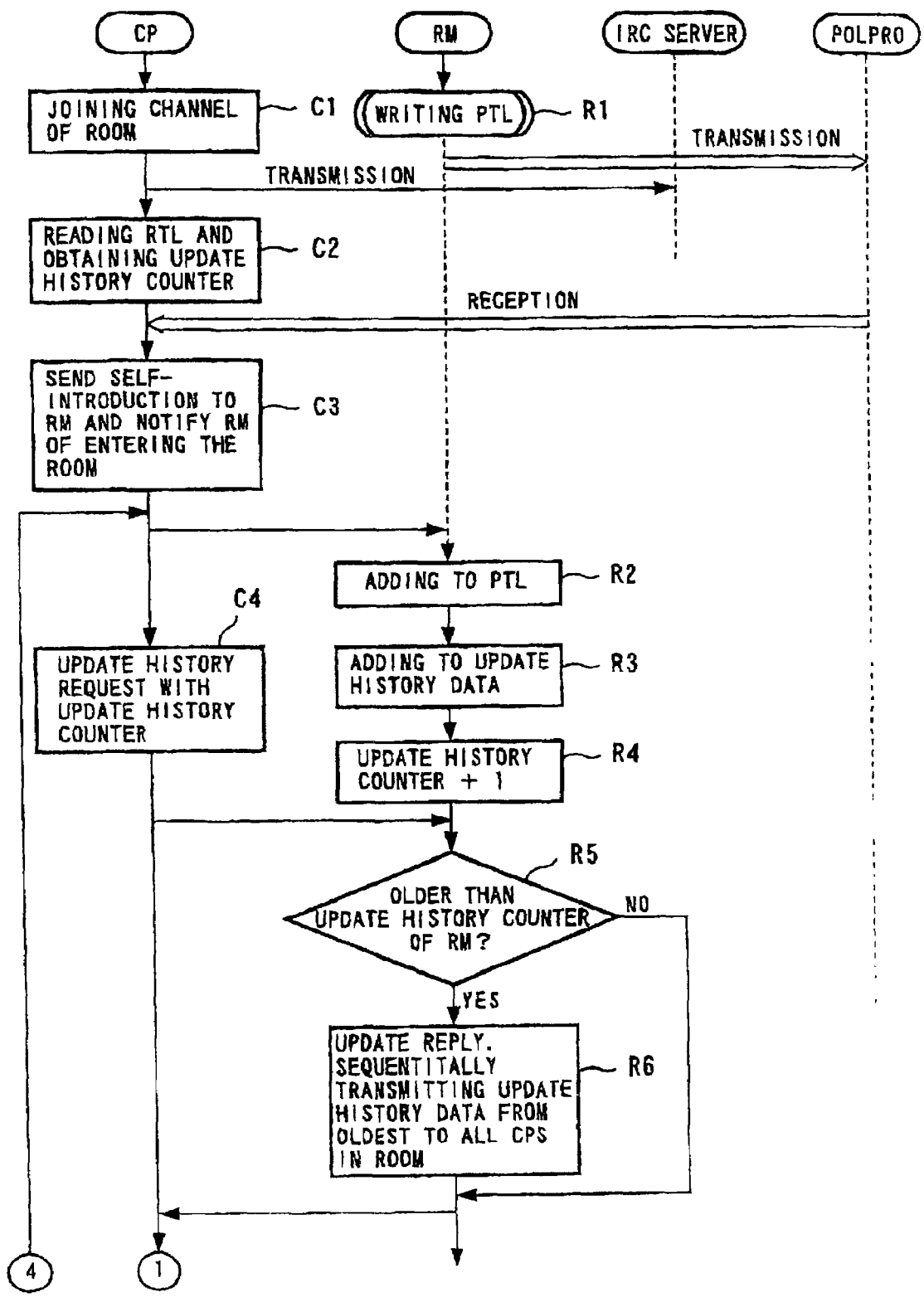
FIG. 6 is a flowchart of the operation according to an embodiment of the invention.

As shown in FIG. 6, the room master RM periodically writes the player table list PTL in the room into the POLPRO, together with the count value of the update history counter described later (step R1). Contemporaneously, the user terminal CP joins in the channel of the room (step C1), reads the player table list PTL, obtains the count value of the update history counter, and stores it in the memory (step C2). Furthermore, the user terminal CP transmits self-introduction information to the room master RM, and notifies it of room entry (step C3). PTL the self-introduction information from the user terminal CP, and also adds the entry to the room of the player (step R2) Furthermore, the self-introduction information from the user terminal CP is added to the update history data, the entry of the player to the room is added, and the count value of the update history counter is incremented (step R4).

Contemporaneously, the user terminal CP requests the room master RM for an update history by adding the current count value of the update history counter (step C4). In response to the update history, the room master RM determines whether or not the count value (count value on the client side) of the update history counter transmitted from the user terminal CP in step C4 is older than the count value (count value on the server system side) of the update history counter incremented by the room master RM. That is, the RM determines whether or not the count value of the update history counter transmitted from the user terminal CP is smaller than the count value of the update history counter of the room master RM (step R5).

As a result of the determination in step R5, when the count value of the update history counter transmitted from the user terminal CP is smaller than the count value of the update history counter of the room master RM, that is, when the update history data stored by the user terminal CP is older than the update history data stored in the room master RM, the update history reply is executed (step R6). That is, in response to the update history request from multiple user terminals CP, the room master RM transmits update history data to ail CPs addressed to the IRC channel in the room, together with the update history counter value. The transmitted update history data is made up of data from the update history data associated with the oldest update counter value in the requests to the update history data associated with the latest update counter value in the RM. In this process, it is not necessary for the room master RM to transmit the update history data individually to each user terminal CP.

Then, upon receipt of the update history data, as shown in FIG. 7, the user terminal CP determines whether the current value of its own update history counter (CP counter) is smaller than the value (maximum value) of the update history counter transmitted from the room master RM in step R6 (step C5). When the value of the CP counter is greater than/equal to the value of the update history counter (RM counter) transmitted from the room master RM (NO in step C5), because the player table list PTL stored in the user terminal CP has been updated with the latest update history data, the processing-skips to step C8 without performing the process in steps C6 and C7.

As a result of the determination in step C5, when the CP counter is smaller than the RM counter, that is, when the player table list PTL stored in the user terminal CP has not been updated with the latest update history data (YES in step C5), the player table list PTL of the user terminal CP is updated with the update history data transmitted from the room master RM, sequentially from the data subsequent to the current CP counter to the latest data (step C6). Thus, the player table list PTL can be updated, and the latest information can be provided for the players. Then, the value of the CP counter matches the value of the RM counter (step C7).

Then, it is determined whether an operation of a player exiting the room has been performed (step C8). If the exiting operation has been performed (YES in step C9), then control is passed to step C13. If the exiting operation has not been performed (NO in step C9), then it is determined whether any table belonging to the room has been selected (step C9).

If any table has been selected, then the IRC channel of the selected table is joined (step C10). Then, the self-introduction information about the player transmitted to the table master TM, and the request to reserve for participation is transmitted (step C11). Then, a game process is performed for the table master TM to start and proceed with a game (step C12). When the player performs an operation of stopping the game using the user terminal CP, then the player exits the IRC channel and the table (step C13).

Contemporaneously, in response to the self-introduction information from the user terminal CP in the process in step C11, the table master TM sets the CP status of the player to 'playing the game' (step T1). Then, the table master TM performs a game process for the user terminal CP, and starts and proceeds with the game (step T2). When the user terminal CP exits the IRC channel and the table in the process in step C13, it sets the CP status to 'chatting' (step T3).

When the table master TM sets the CP status to 'playing the game' in step T1, the room master RM updates the player table list PTL, and the state of the player in the player list PTL changes from 'chatting' to 'playing the game' (step R7). Then, it adds the information that the player is playing the game to the update history data (step R8), and the value of the update history counter is incremented (step R9).

When the table master TM changes the CP status into 'chatting' in step T3, the room master RM updates the player table list PTL and changes the status of the player in the player table list PTL from 'playing the game' to 'chatting' (step R7). Furthermore, it adds the information that the player is 'chatting' to the update history data (step R8), thereby incrementing the value of the update history counter (step R9).

Thus, the player table list PTL updated in step R7 and the count value of the update history counter incremented in step R9 are written to the POLPRO in the process in step R1 (FIG. 6).

In the above-mentioned embodiment, the room master RM sequentially transmits the stored update history data and count value when the, update history data is transmitted to the user terminal CP. However, for example, when there are multiple pieces of update history data about the same player in the update history data to be transmitted, only the latest data is transmitted. Thus, the amount of data being transmitted can be reduced.

In the above mentioned embodiment, when a count value held in the user terminal CP is different from a count value stored in the room master RM by a value larger than a predetermined value, only the latest player table list PTL can be read.

According to an embodiment of the present invention, a player can easily select a desired game. Additionally, according to an embodiment of the present invention, the information about players can be appropriately provided, and the information about the players can be easily and properly managed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

What is claimed is:

1. An online system having a plurality of client systems operated by players, and a server system connected to the client systems through a network, forming a virtual space through which information about the players is provided for the client systems, wherein:

the server system comprises:

a generating system that generates update history information including room state data indicating changes in involvement status of the players in the virtual space;

an order information generating system that generates order information having a value that increments each time new update history information was generated;

a storage system that stores the update history information in association with the order information value generated when the update history information was generated; and a transmitter that transmits, to the client system, only the update history information not yet received, which corresponds to order information values that are subsequent to a current order information value on a client side, and the client system comprises:

an order information storage system that stores the current order information value on the client side corresponding to the update history information received from the server system;

a transmission requesting system that transmits, to the server system, a request for the update history information not yet received from the server system, which request includes the current order information value on the client side;

a receiver that receives the update history information transmitted from the server system, together with the corresponding order information value;

an updating system that updates a room state in accordance with the update history information received by the receiver; and an order updating system that causes the order information storage system to store the order information value received by the receiver as the current order information value on the client side.

2. A server system connected to a plurality of client systems through a network, forming a virtual space through which information about players is provided for the client systems, comprising:

a generating system that generates update history information including room state data indicating changes in involvement status of the players in the virtual space;

an order information generating system that generates order information having a value that increments each time new update history information was generated;

a storage system that stores the update history information in association with the order information value generated when the update history information was generated; and a transmitter that transmits, to the client system, only the update history information not yet received, which corresponds to order information values that are subsequent to a current order information value on a client side.

3. The server system according to claim 2, wherein:
the virtual space includes a plurality of first spaces, second spaces obtained by dividing each of the first spaces, and third spaces obtained by dividing each of the second spaces; and
the generating system generates the update history information based on a change in an involvement status of the players in the third space.

4. The server system according to claim 2, wherein the transmitter transmits, to the plurality of client systems, the order information subsequent to earliest order information among the latest order information transmitted by each of the plurality of client systems, together with the update history information corresponding to the order information.

5. The server system according to claim 4, wherein the transmitter transmits the update history information according to an order in which the update history information is generated.

6. A client system operated by a player and connected to a server system forming a virtual space through which information about players is provided, comprising:
an order information storage system that stores a current order information value on a client side corresponding to update history information received from the server system, the update history information including room state data indicating changes in involvement status of players in the virtual space;
a transmission requesting system that transmits, to the server system, a request for update history information not yet received from the server system, which request includes the current order information value on the client side;
a receiver that receives the update history information transmitted from the server system, together with the corresponding order information value, the received update history information including only update history information not previously received from the server system;
an updating system that updates a room state in accordance with the update history information received by the receiver; and
an order updating system that causes the order information storage system to store the order information value received by the receiver as the current order information value on the client side.

7. A player information providing method for use with a server system connected to a plurality of client systems through a network, forming a virtual space through which information about players is provided for the client systems, comprising:
generating update history information including room state data indicating chances in involvement status of the players in the virtual space;
generating order information having a value that increments each time new update history information was generated;
storing the update history information in association with the order information value generated when the update history information was generated; and
transmitting, to the client system, only the update history information not yet received, which corresponds to order information values that are subsequent to the current order information value on a client side.

8. A player information management method for use with a client system operated by a player and connected to a server system forming a virtual space through which information about players is provided, comprising:
storing a current order information value on a client side corresponding to update history information received from the server system, the update history information including room state data indicating changes in involvement status of players in the virtual space;
transmitting, to the server system, a request for update history information not yet received by the client system, which request includes the current order information value on the client side;
receiving the update history information transmitted from the server system, together with the corresponding order information value, the received update history information including only update history information not previously received from the server system;
updating a room state in accordance with the received update history information; and
storing the received order information value as the current order information value on the client side.

9. A storage medium on which is recorded a player information providing program for causing a computer to provide information about players by forming a virtual space for a client connected through a network, the program causing the computer to execute:
generating update history information including room state data indicating changes in involvement status of the players in the virtual space;
generating order information having a value that increments each time new update history information was generated;
storing the update history information together with the order information value generated when the update history information was generated; and
transmitting, to the client system, only the update history information not yet received, which corresponds to order information values that are subsequent to the current order information value on a client side.

10. A storage medium on which is recorded a player information management program for causing a computer to manage player information provided by a server system which forms a virtual space, the program causing the computer to execute:
storing a latest order information value on a client side corresponding to the update history information received by the client system, the update history information including room state data indicating changes in involvement status of players in the virtual space;
transmitting, to the server system, a request for update history information not yet received by the client system, which request includes the latest order information value on the client side;
receiving the update history information transmitted from the server system, together with the corresponding order information value, the received update history information including only update history information not previously received from the server system;
updating a room state in accordance with the received update history information; and
storing the received order information value as the latest order information value on the client side.

* * * * *